US012112861B2

(12) United States Patent
Nakayama et al.

(10) Patent No.: US 12,112,861 B2
(45) Date of Patent: Oct. 8, 2024

(54) COAXIAL CABLE

(71) Applicant: TOTOKU ELECTRIC CO., LTD., Tokyo (JP)

(72) Inventors: Takeyasu Nakayama, Ueda (JP); Hiroto Imamura, Ueda (JP); Satoshi Yamazaki, Ueda (JP)

(73) Assignee: TOTOKU ELECTRIC CO., LTD., Tokyo (JP)

( * ) Notice: Subject to any disclaimer, the term of this patent is extended or adjusted under 35 U.S.C. 154(b) by 108 days.

(21) Appl. No.: 17/916,624

(22) PCT Filed: Mar. 19, 2021

(86) PCT No.: PCT/JP2021/011283
§ 371 (c)(1),
(2) Date: Oct. 3, 2022

(87) PCT Pub. No.: WO2021/200247
PCT Pub. Date: Oct. 7, 2021

(65) Prior Publication Data

US 2023/0154652 A1 May 18, 2023

(30) Foreign Application Priority Data

Apr. 3, 2020 (JP) ................................ 2020-067219
Jul. 15, 2020 (KR) ........................ 10-2020-0087301

(51) Int. Cl.
*H01B 11/18* (2006.01)
*H01B 7/02* (2006.01)

(52) U.S. Cl.
CPC ......... *H01B 11/183* (2013.01); *H01B 7/0241* (2013.01); *H01B 11/1821* (2013.01)

(58) Field of Classification Search
CPC .............................. H01B 7/0208; H01B 11/18
(Continued)

(56) References Cited

U.S. PATENT DOCUMENTS 5,739,471 A * 4/1998 Burisch ................ H01B 11/105 174/103
10,043,599 B2 * 8/2018 Hayashishita ......... H01B 1/026
(Continued)

FOREIGN PATENT DOCUMENTS

JP 3032624 U 12/1996
JP 2007-188782 A 7/2007
(Continued)

OTHER PUBLICATIONS

International Search Report of PCT/JP2021/011283 dated May 25, 2021 [PCT/ISA/210].

*Primary Examiner* — Chau N Nguyen
(74) *Attorney, Agent, or Firm* — Sughrue Mion, PLLC

(57) ABSTRACT

To provide a coaxial cable with a favorable appearance and excellent processability. The above-described problem is solved by a coaxial cable comprising a center conductor (11), an insulator (12) provided on an outer periphery of the center conductor (11), an external conductor (13, 14) provided on an outer periphery of the insulator (12), and an outer coated body (15, 16) covering the external conductor (13, 14). The external conductor (13, 14) is constituted by a lateral winding shield (13) provided with metal fine wires laterally wound on the outer periphery of the insulator (12), and a metal resin tape (14) wound in a layer on the lateral winding shield (13) with a metal layer side being on an inside. The outer coated body (15, 16) is constituted by a resin tape (15) wound on the metal resin tape (14), and an extruded sheath (16) covering the resin tape (15). Given T1 as a thickness of the metal resin tape (14) and T2 as a thickness of the resin tape (15), T2/T1 is within a range from 0.180 to 0.800.

8 Claims, 2 Drawing Sheets

(58) Field of Classification Search
USPC .................................................... 174/120 R
See application file for complete search history.

(56) References Cited

U.S. PATENT DOCUMENTS

| | | | | |
|---|---|---|---|---|
| 10,991,485 | B2 * | 4/2021 | Huang .................... | H01B 7/22 |
| 2002/0097966 | A1 * | 7/2002 | Zelesnik ................ | F16L 11/22<br>385/100 |
| 2015/0287501 | A1 | 10/2015 | Rupflin et al. | |

FOREIGN PATENT DOCUMENTS

| | | | |
|---|---|---|---|
| JP | 2016-500905 | A | 1/2016 |
| JP | 2020-021701 | A | 2/2020 |

* cited by examiner

COAXIAL CABLE

CROSS REFERENCE TO RELATED APPLICATIONS

This application is a National Stage of International Application No. PCT/JP2021/011283, filed Mar. 19, 2021, claiming priority to Japanese Patent Application No. 2020-067219, filed Apr. 3, 2020 and Korean Patent Application No. 10-2020-0087301, filed Jul. 15, 2020.

BACKGROUND ART

Coaxial cables are utilized for transmission of high-frequency signals because of their excellent shielding characteristics against noise and the like. Such coaxial cables have a problem in that, in a case in which external force is applied to the cable, the insulator is deformed and impedance fluctuates, causing reflection attenuation and reducing transmission efficiency. Further, coaxial cables used for in-device antenna wiring and semiconductor devices require a smaller diameter and favorable bending characteristics.

In response to such requirements, Patent Document 1 proposes a coaxial cable that satisfies shielding characteristics, flexibility, a smaller diameter configuration, bending resistance, and economic efficiency, and improves terminal processability. This coaxial cable has a structure in which a center conductor, an insulator, an external conductor having a lateral winding shield structure, and an outer coating are coaxially layered sequentially. In a case in which the outer coating is perfluoroalkoxy alkane (PFA), the insulator is formed by fluorinated PFA, and in a case in which the outer coating is fluorinated ethylene propylene (FEP) or ethylene tetrafluoro ethylene (ETFE), the insulator is formed by either fluorinated FEP, PFA, or fluorinated PFA. Furthermore, it has been proposed that providing a tape layer with deposited or plated metal between the insulator and the external conductor, setting a lateral winding angle of the lateral winding of the external conductor to 70° to 85°, and using a conductor with a plurality of wires or a single wire as the center conductor is preferred.

PRIOR ART DOCUMENTS

Patent Documents

Patent Document 1: Japanese Laid-Open Patent Application Publication No. 2007-188782

SUMMARY OF THE INVENTION

Problems to be Solved by the Invention

In recent years, coaxial cables have been used to transmit high-frequency signals in electronic devices that are being increasingly miniaturized, such as personal computers, smartphones, and tablet terminals, and a smaller diameter is required to enable realization of in-device wiring in narrow spaces. In particular, coaxial cables used for in-device antenna wiring and semiconductor devices that support the fifth generation communication standard (5G) require a small diameter and favorable transmission characteristics.

The coaxial cable in the above-described Patent Document 1 is provided with the external conductor composed of a lateral winding shield around which fine wires are laterally wound, which is advantageous for achieving a smaller diameter compared to an external conductor composed of a braided shield obtained by braiding fine wires such as in the related art. However, in the lateral winding shield, gaps tend to occur between the laterally wound fine wires during wiring and the like, which may reduce the shielding effect. To solve such problems, metal resin tape has been wound in layers on the lateral winding shield by a predetermined wrap to suppress the reduction of the shielding effect.

In a case in which a metal resin tape is wound in layers, air exists in a step produced by a thickness of the metal resin tape, and this air expands with heat during subsequent extrusion molding of an extruded sheath, resulting in a problem of the occurrence of unevenness and deterioration in appearance. Therefore, extrusion molding is performed while suctioning with a vacuum pump so that as little air as possible remains, but this has not been a sufficient solution. Such appearance irregularities change the outer diameter of the coaxial cable in a longitudinal direction and, when the terminals are connected to connectors under the same terminal processing conditions, the processing yield deteriorates, and thus the terminal processing conditions must be changed each time.

The present invention has been made to resolve the above-described problems, and an object thereof is to provide a coaxial cable used in in-device antenna wiring and semiconductor devices compatible with the fifth generation communication standard (5G), and having a favorable appearance and excellent processability.

Means for Solving the Problems

A coaxial cable according to the present invention comprises a center conductor, an insulator provided on an outer periphery of the center conductor, an external conductor provided on an outer periphery of the insulator, and an outer coated body covering the external conductor. The external conductor is constituted by a lateral winding shield provided with metal fine wires laterally wound on the outer periphery of the insulator, and a metal resin tape wound in a layer on the lateral winding shield with a metal layer side being on an inside. The outer coated body is constituted by a resin tape wound on the metal resin tape, and an extruded sheath covering the resin tape. Given T1 as a thickness of the metal resin tape and T2 as a thickness of the resin tape, T2/T1 is within a range from 0.180 to 0.800.

According to this invention, the thickness T2 of the resin tape and the thickness T1 of the metal resin tape have the above-described relationship, making it possible to reduce a size of the step (approximately 0.180 to 0.800) compared to a case of the metal resin tape alone, and suppress appearance irregularities caused by the air existing in the step. This makes it possible to suppress changes in outer diameter in a longitudinal direction and process terminals under the same conditions when connecting the terminals to connectors. Further, the external conductor includes the lateral winding shield, making it possible to realize a smaller diameter compared to a braided shield. Furthermore, the metal resin tape is provided on the lateral winding shield, making it possible to suppress a reduction in the shielding effect, even in a case in which gaps temporarily occur in the lateral winding shield. Such a coaxial cable makes it possible to realize a smaller diameter that enables in-device wiring in a narrow space, and is particularly preferred for use in in-device antenna wiring and semiconductor devices that support the fifth generation communication standard (5G).

In the coaxial cable according to the present invention, the metal resin tape consists of one piece of tape or two pieces of tape. In the case of consisting of two pieces, a first metal resin tape and a second metal resin tape are wound in layers, but with one piece of metal resin tape being wound first, a rigidity of the coaxial cable can be increased. Further, the two pieces of metal resin tape as a whole can serve to increase an amount of metal and further increase the shielding effect of the coaxial cable.

In the coaxial cable according to the present invention, in a case in which the metal resin tape is constituted by two pieces of metal resin tape, a thickness of the first metal resin tape is the same as a thickness of the second metal resin tape, or is thinner than the thickness of the second metal resin tape. According to this invention, the first metal resin tape and the second metal resin tape are given the thicknesses described above, making it possible to decrease a strain applied to the coaxial cable when the metal resin tape is wound. In particular, a total thickness is increased, making it possible to improve the shielding characteristics at higher frequencies. Further, one piece of the thin first metal resin tape is wound first, thereby strengthening the rigidity of the coaxial cable and making it possible to facilitate winding when the thick second metal resin tape is subsequently wound.

In the coaxial cable according to the present invention, in a case in which the metal resin tape is constituted by one piece of metal resin tape, a thickness of the metal resin tape is 8 μm to 18 μm, and a thickness of the resin tape is 4 μm to 9 μm. According to this invention, the thickness of the metal resin tape and the thickness of the resin tape are within the above-described ranges, making it possible to reduce the size of the step (approximately 9 μm or less) compared to a case in which the metal resin tape is used alone.

In the coaxial cable according to the present invention, in a case in which the metal resin tape is constituted by two pieces of metal resin tape, a total thickness of the two pieces of metal resin tape is 16 μm to 26 μm, and a thickness of the resin tape is 4 μm to 9 μm. According to this invention, the thickness of the metal resin tape and the thickness of the resin tape are within the above-described ranges, making it possible to reduce the size of the step (approximately 9 μm or less) compared to a case in which the metal resin tape is used alone. Furthermore, the total thickness of the two pieces of metal resin tape is within the above-described range, making it possible to increase a flexibility of the coaxial cable even when the two pieces of metal resin tape are wound in layers.

In the coaxial cable according to the present invention, the metal resin tape and the resin tape are wound in layers within a range of ¼ wrap to ½ wrap. According to this invention, the size of the step can be reduced in a case in which winding is performed in layers within these ranges.

In the coaxial cable according to the present invention, an adhesive layer is provided on one surface of the resin tape and winding is performed so that the adhesive layer is on an inside. According to this invention, the adhesive layer of the resin tape fixes the metal resin tape so that there is no position shift and thus, even if stress is applied during coaxial cable wiring, a position shift does not occur in the lateral winding shield. As a result, it is possible to suppress a reduction in the shielding effect.

Effect of the Invention

According to the present invention, it is possible to provide a coaxial cable used in in-device antenna wiring and semiconductor devices compatible with the fifth generation communication standard (5G), and having a favorable appearance and excellent processability. In particular, appearance irregularities are suppressed, making it possible to suppress changes in outer diameter in a longitudinal direction and process the terminals under the same conditions when connecting the terminals to the connectors. Further, it is possible to realize a smaller diameter compared to a braided shield and, even in a case in which gaps temporarily occur in the lateral winding shield, suppress a reduction in the shielding effect.

EMBODIMENTS OF THE INVENTION

Embodiments of a coaxial cable according to the present invention will now be described with reference to the drawings. It should be noted that the present invention includes aspects of the same technical concept as that of the forms set forth in the embodiments and the drawings described below, and the technical scope of the invention is not limited only to the description of the embodiments and the description of the drawings.

Coaxial Cable

Figure 1:
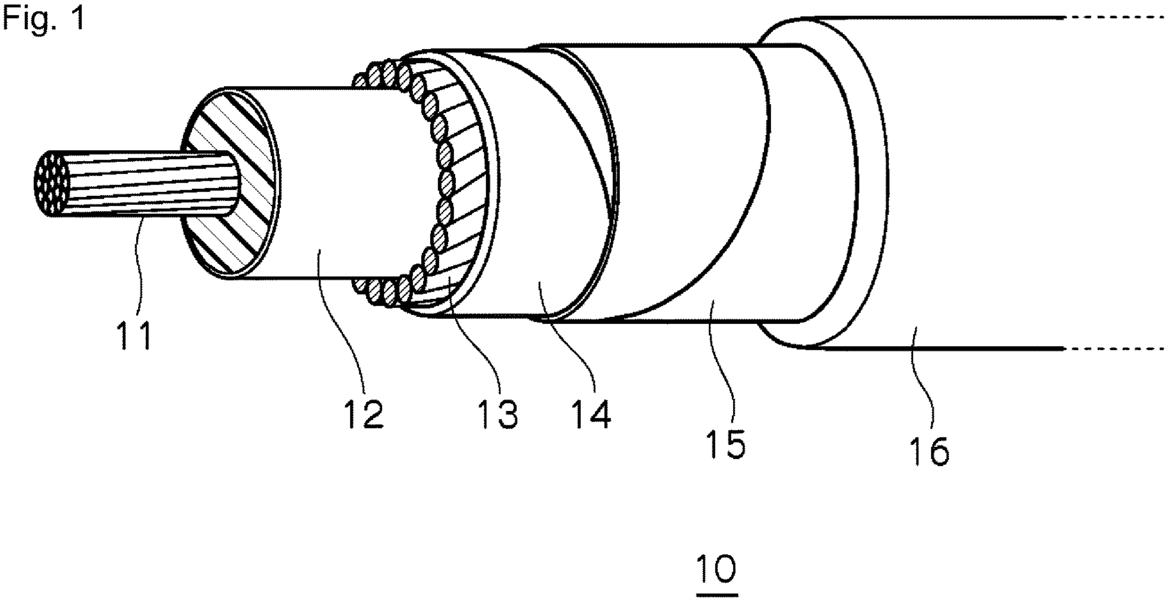
FIG. 1 is a perspective configuration view illustrating an example of a coaxial cable according to the present invention.

A coaxial cable 10 according to the present invention, as illustrated in FIG. 1, is a coaxial cable including at least a center conductor 11, an insulator 12 provided on an outer periphery of the center conductor 11, external conductors 13, 14 provided on an outer periphery of the insulator 12, and outer coated bodies 15, 16 covering the external conductors 13, 14. Then, as characteristics thereof, the external conductors 13, 14 is constituted by a lateral winding shield 13 provided with metal fine wires laterally wound on the outer periphery of the insulator 12, and a metal resin tape 14 wound in a layer on the lateral winding shield 13 with a metal layer side being on an inside. The outer coated bodies 15, 16 is constituted by a resin tape 15 wound on the metal resin tape 14, and an extruded sheath 16 covering the resin tape 15. Given T1 as a thickness of the metal resin tape 14 and T2 as a thickness of the resin tape 15, T2/T1 is within a range from 0.180 to 0.800.

In this coaxial cable 10, (1) the thickness T1 of the metal resin tape 14 and the thickness T2 of the resin tape 15 have a relationship such that "T2/T1=0.180 to 0.800," making it possible to reduce a size of a step (approximately 0.180 to 0.800) compared to a case of the metal resin tape 14 alone, and thus suppress appearance irregularities caused by air existing in the step. This makes it possible to suppress changes in outer diameter in a longitudinal direction and process terminals under the same conditions when connecting the terminals to connectors. (2) Further, the external conductor includes the lateral winding shield 13, making it possible to realize a smaller diameter compared to a braided shield. (3) Furthermore, the metal resin tape 14 is provided on the lateral winding shield 13, making it possible to suppress a reduction in the shielding effect, even in a case in which gaps temporarily occur in the lateral winding shield 13. Such a coaxial cable 10 makes it possible to realize a smaller diameter that enables in-device wiring in a narrow space, and is particularly preferred for use in in-device antenna wiring and semiconductor devices that support the fifth generation communication standard (5G).

In the following, each component will be described in detail.

The coaxial cable 10, as illustrated in FIG. 1, is constituted by the center conductor 11, the insulator 12 provided on the outer periphery of the center conductor 11, the external conductors 13, 14 provided on the outer periphery of the insulator 12, and the outer coated bodies 15, 16 covering the external conductors 13, 14.

Center Conductor

The center conductor 11 is constituted by a single strand extending in a longitudinal direction of the coaxial cable 10, or is constituted by a plurality of strands twisted together. The type of strand is not particularly limited as long as composed of a metal having favorable conductivity, but preferable examples include a metal conductor having favorable conductivity, such as copper wire, copper alloy wire, aluminum wire, aluminum alloy wire, copper-aluminum composite wire, or any of these with a plating layer on a surface thereof. Copper wire and copper alloy wire are particularly preferred from the standpoint of high frequency use. As the plating layer, a solder plating layer, a tin plating layer, a gold plating layer, a silver plating layer, a nickel plating layer, or the like is preferred. A cross-sectional shape of the strand is also not particularly limited and, in the wire material thereof, may be circular or substantially circular or may be rectangular.

A cross-sectional shape of the center conductor 11 is also not particularly limited. The shape may be circular (including oval) or may be rectangular or the like, but is preferably circular. An outer diameter of the center conductor 11 is desirably as large as possible so that an electric resistance (alternating-current resistance, conductor resistance) is reduced and, to reduce a final outer diameter of the coaxial cable 10, examples thereof include a range of about 0.09 to 1 mm. A surface of the center conductor 11 may be provided with an insulating film (not illustrated), as necessary. A type and a thickness of the insulating film are not particularly limited, but a film that breaks down well during soldering, for example, is preferred, and preferable examples thereof include a thermosetting polyurethane film or the like.

Insulator

Figure 2A:
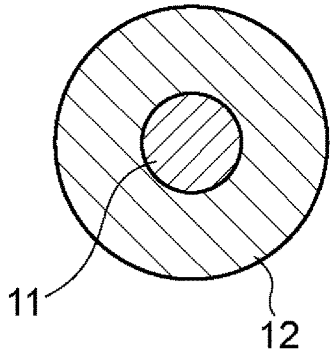
FIG. 2A is an example of a case in which an insulator has a solid structure.
Figure 2B:
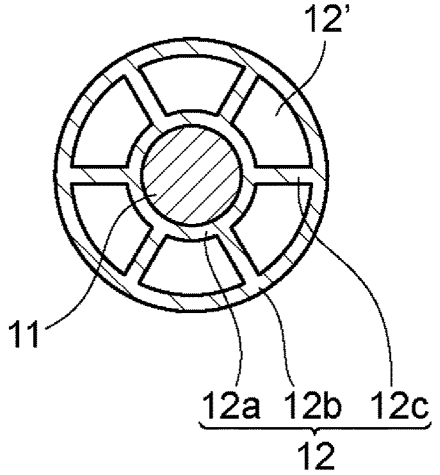
FIG. 2B is an example of a case in which the insulator has a hollow structure.

The insulator 12, as illustrated in FIG. 1 and FIGS. 2A and 2B, is an insulating layer having a low dielectric constant and continuously provided in the longitudinal direction on the outer periphery of the center conductor 11. A material of the insulator 12 is not particularly limited, and is selected as desired in correspondence with the required impedance characteristics, and a fluorine-based resin having a low dielectric constant of 2.0 to 2.5, such as, for example, perfluoroalkoxy alkane (PFA; ε2.1), ethylene tetrafluoro ethylene (ETFE; ε2.5), or fluorinated ethylene propylene (FEP; ε2.1) is preferred and, among these, PFA resin is preferred. It should be noted that the material of the insulator 12 may contain a coloring agent. A thickness of the insulator 12 is also not particularly limited, and is selected as desired in correspondence with the required impedance characteristics, and a range of about 0.15 to 1.5 mm, for example, is preferred. A method of forming the insulator 12 is not particularly limited, but a solid structure, a hollow structure, or a foam structure can be easily formed by extrusion.

The insulator 12 may be a solid structure illustrated in FIG. 2A, may be a hollow structure illustrated in FIG. 2B, or may be a foam structure (not illustrated). It should be noted that the hollow structure includes a void part 12' in the structure interior, and the void part 12' may have, for example, a cross-sectional form surrounded by an inner annular part 12*a*, an outer annular part 12*b*, and a coupling part 12*c*, or the like. In the case of a hollow structure or a foam structure, there is an additional effect of reducing a material density of the insulator 12, and increasing a flexibility of the insulator 12.

External Conductor

The external conductors 13, 14, as illustrated in FIG. 1, are provided on the outer periphery of the insulator 12. The external conductors 13, 14 are constituted by the lateral winding shield 13 provided with metal fine wires laterally wound on the outer periphery of the insulator 12, and the metal resin tape 14 wound in a layer on the lateral winding shield 13 with a metal layer side being on an inside. The external conductor having a two-layered structure of the lateral winding shield 13 and the metal resin tape 14 has a larger conductor cross-sectional area, making it possible to reduce insertion loss. Further, the external conductor includes the lateral winding shield 13, making it possible to realize a smaller diameter compared to a braided shield. Furthermore, the metal resin tape 14 is provided on the lateral winding shield 13 in an electrically connected mode (fine wires and metal layer being in direct contact), making it possible to suppress a reduction in the shielding effect, even in a case in which gaps temporarily occur between the fine wires upon stress being applied to the lateral winding shield 13.

Lateral Winding Shield

The lateral winding shield 13 is formed by laterally winding metal fine wires on the insulator 12, as illustrated in FIG. 1. The laterally wound metal fine wires may be in a single layer illustrated in FIG. 1 or may be in laminated layers (not illustrated), although not particularly limited, a single layer is preferred. Compared to a braided structure in which fine wires cross each other to form twists, the lateral winding of the metal fine wires allows the thickness of the lateral winding shield 13 to be thinned to the same extent that effects (sealing effect and the like) are obtained, which is advantageous from the standpoint of making the diameter of the coaxial cable 10 smaller.

The metal fine wire is not particularly limited as long as the wire has favorable conductivity and can be provided on the outer periphery of the insulator 12 as the lateral winding shield 13 that constitutes the coaxial cable 10. For example, various types of metal fine wires represented by tin-plated copper wires and the like can be preferably used. An outer diameter of the metal fine wire is not particularly limited and is determined in relation to an outer diameter of the insulator 12, but examples thereof include an outer diameter within a range of about 0.04 to 0.1 mm. The quantity of metal fine wires is also selected as desired depending on the outer diameter of the insulator 12, a planned outer diameter of the coaxial cable 10, and the like. A lateral winding pitch when the metal fine wires are laterally wound is also not particularly limited, but is normally preferably about 0.5 to 11 mm.

Metal Resin Tape

The metal resin tape 14 is provided laterally wound (spirally wound) on the lateral winding shield 13, as illustrated in FIG. 1. The metal resin tape 14 is constituted by at least a resin base material and a metal layer provided on an outermost surface of one surface of the resin base material. This metal resin tape 14 is provided laterally wound with the side of the metal layer being on the side of the lateral winding shield 13. This way, even in a case in which a gap temporarily occurs in the lateral winding shield 13, the fine wires of the lateral winding shield 13 and the metal layer of the metal resin tape 14 come into direct contact, making it possible to suppress a reduction in the shielding effect. It should be noted that the terms "at least" and "outermost surface" mean that other layers may be provided between the resin base material and the metal layer, or on the other surface of the resin base material, as desired.

The metal resin tape 14 is wound in layers within a range of ¼ wrap to ½ wrap. With the metal resin tape 14 wrapped within this range, it is possible to ensure contact between the metal layer constituting the metal resin tape 14 and the lateral winding shield 13, and realize a stable shielding effect. When a wrap is less than ¼, the overlap is small and thus may shift during lateral winding, and when the wrap exceeds ½, the overlap of the metal resin tape 14 is large, which may be disadvantageous in terms of achieving a smaller diameter. It should be noted that a winding pitch of the metal resin tape 14 is set as desired by a width and the wrap of the metal resin tape 14 and is thus not particularly limited, but in a case in which the width of the metal resin tape 14 is within a range of about 3 to 6 mm, for example, the winding pitch is preferably within a range of 1.5 to 10 mm, for example. A lateral winding direction of the metal resin tape 14 may be the same as a lateral winding direction of the metal fine wires described above or may be a winding direction opposite thereto, but a winding direction opposite thereto is preferred.

The lateral winding of the metal resin tape 14 is wound with the metal layer side opposing and thus facing the metal fine wires so that the metal layer is in direct contact with the metal fine wires of the lateral winding shield 13. As a result, the metal fine wires and the metal layer of the metal resin tape are brought into direct contact, making it possible to further stabilize the electrical continuity and ensure stable shielding characteristics. By being wound laterally on the basis of the above-described wrap, the metal layer of the metal resin tape 14 can be disposed on and in direct contact with the metal fine wires without producing gaps between the metal layers. Furthermore, the metal resin tape 14 itself is fixed in its laterally wound state by the adhesive layer of the resin tape 15 and thus, even if the metal fine wires shift in position slightly due to stress during the wiring of the coaxial cable 10, the metal resin tape 14 provided thereon does not shift in position, making it possible to ensure stable shielding characteristics.

The resin base material constituting the metal resin tape 14 is not particularly limited, but a polyester film such as polyethylene terephthalate and polyethylene naphthalate can be preferably used. A thickness of the resin base material is selected as desired from those within a range of about 2 to 16 mm, for example.

Preferable examples of the metal layer constituting the metal resin tape 14 include a copper layer, an aluminum layer, or the like. Preferable examples of the metal layer include a film formed on the resin base material by vapor deposition or plating, metal foil bonded via an adhesive layer (for example, polyester-based thermoplastic adhesive resin, or the like) provided as necessary, or the like. A thickness of the metal layer is not particularly limited and differs depending on the formation means as well, but can be selected as desired from those within a range of about 2 to 8 μm for a film formed by vapor deposition or plating.

A thickness of the metal resin tape 14 is preferably within a range of about 8 to 18 μm. Setting the thickness within this range can contribute to a reduction in diameter of the coaxial cable 10.

Figure 3:
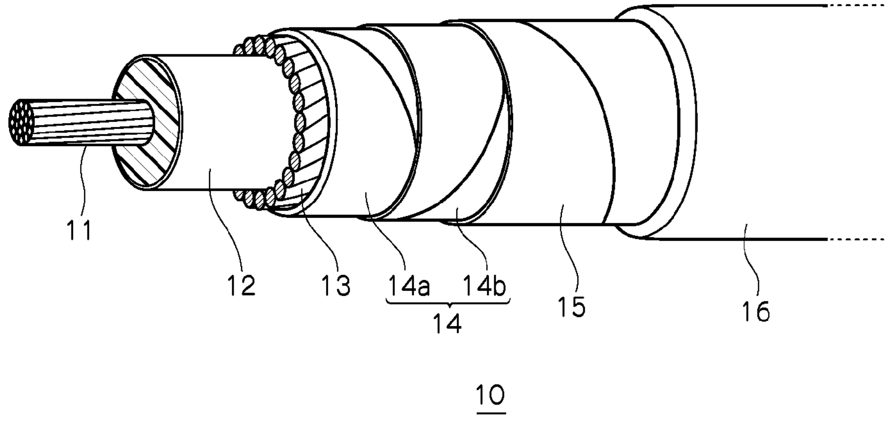
FIG. 3 is a perspective configuration view illustrating another example of a coaxial cable according to the present invention.

As described above, although a case in which the metal resin tape 14 consists of one piece as illustrated in FIG. 1 has been described, the metal resin tape 14 may be constituted by two pieces of metal resin tape 14*a*, 14*b* as illustrated in FIG. 3. In the case of the metal resin tape 14 consisting of two pieces, the first metal resin tape 14*a* and the second metal resin tape 14*b* are wound in layers. The first metal resin tape is wound first, thereby strengthening the rigidity of the coaxial cable and making it possible to facilitate winding when the second metal resin tape is subsequently wound. Further, the amount of metal of the two pieces of metal resin tape as a whole increases, thereby making it possible to increase the shielding effect of the coaxial cable.

Regarding thickness, a thickness of the first metal resin tape and a thickness of the second metal resin tape are preferably the same. Making the thicknesses the same makes it possible to wind the metal resin tape under the same conditions, and thus has the advantage of making it easier to wind the metal resin tape, and facilitates an increase in the flexibility of the coaxial cable. On the other hand, the thickness of the first metal resin tape 14*a* can also be made thinner than the thickness of the second metal resin tape 14*b*. This way, it is possible to increase the rigidity of the coaxial cable 10 by the first metal resin tape 14*a*, and decrease the strain applied to the coaxial cable 10 when the second metal resin tape 14*b* is wound.

A total thickness of the two pieces of metal resin tape 14*a*, 14*b* is increased, making it possible to improve the shielding characteristics at higher frequencies. Such a total thickness is preferably 16 μm to 26 μm, and the shielding characteristics can be specifically set to −50 dB or less.

In a case in which the metal resin tape 14 is constituted by the two pieces of metal resin tape 14*a*, 14*b*, the second metal resin tape 14*b* is provided laterally wound (spirally winding) on the first metal resin tape 14*a* as in the case of the metal resin tape 14 being constituted by one piece of metal resin tape. The structures of each of the metal resin tapes 14*a*, 14*b* are also constituted by at least a resin base material and a metal layer provided on an outermost surface of one surface of the resin base material as described above. The second metal resin tape 14*b* is also provided laterally wound with the side of the metal layer being on the side of the first metal resin tape 14*a*. It should be noted that, by making the thickness of the two pieces of metal resin tape 14*a*, 14*b* thicker than the thickness of just one piece of metal resin tape 14, it is possible to increase the rigidity of the coaxial cable 10 and decrease the strain applied to the coaxial cable 10 when the second metal resin tape 14*b* is wound. Further, the first metal resin tape 14*a* and the second metal resin tape 14*b* are each wound in layers within a range of ¼ wrap to ½ wrap. With the two pieces of metal resin tape 14*a*, 14*b* wrapped within this range, it is possible to ensure contact between the metal layer constituting the metal resin tape 14 and the lateral winding shield 13, and realize a stable shielding effect. It should be noted that a winding pitch of each metal resin tape 14*a*, 14*b* is set as desired by the width and the wrap of each metal resin tape 14*a*, 14*b*, and is thus not particularly limited.

In a case in which the two pieces of metal resin tape 14*a*, 14*b* are laterally wound, the metal layer of the first metal resin tape 14*a* comes into direct contact with the metal fine wires of the lateral winding shield 13, but the metal layer of the second metal resin tape 14*b* does not come into direct contact with the metal layer of the first metal resin tape 14*a*. Even in this case, the advantage is that the amount of metal of the coaxial cable overall can be increased. It should be noted that making the winding directions of the first metal resin tape 14*a* and the second metal resin tape 14*b* opposite directions maintains the flexibility of the coaxial cable and makes the metal resin tape less likely to shift in position, and thus is more preferred. Furthermore, the second metal resin tape 14*b* itself is fixed in its laterally wound state by the adhesive layer of the resin tape 15 and thus, even if the metal fine wires shift in position slightly due to stress during the wiring of the coaxial cable 10, the metal resin tape 14 provided thereon does not shift in position, but the first metal resin tape 14*a* is not fixed by the adhesive layer of the resin tape 15. However, even in this case, the first metal resin tape 14*a* has the advantage of being fixed by a tape-winding tension of the second metal resin tape 14*b*.

The resin base materials and metal layers respectively constituting the two pieces of metal resin tape 14*a*, 14*b* and thicknesses thereof are the same as those described above. Further, respective thicknesses of the metal resin tapes 14*a*, 14*b* are preferably within a range of about 8 to 18 μm as described above, but a total thickness of the two pieces of metal resin tape 14*a*, 14*b* is preferably within a range of 16 to 26 μm. This way, it is possible to reduce the size of the step (approximately 9 μm or less) compared to a case in which the metal resin tape is used alone. Furthermore, the total thickness of the two pieces of metal resin tape is within the above-described range, making it possible to absorb impact that occurs when the two pieces of metal resin tape 14*a*, 14*b* are wound by the elasticity of the resin tape 15.

Outer Coated Body

The outer coated bodies 15, 16, as illustrated in FIG. 1, are provided on the outer periphery of the external conductors 13, 14, and are specifically provided on the metal resin tape 14. The outer coated bodies 15, 16 are constituted by the resin tape 15 wound on the metal resin tape 14, and the extruded sheath 16 covering the resin tape 15. Materials of the resin tape 15 and the extruded sheath 16 are not particularly limited as long as the materials have insulating properties. The resin tape 15 is a resin tape including an adhesive layer on one surface thereof and is provided spirally wound on the metal resin tape 14. The extruded sheath 16 is an insulating sheath provided by extruding a resin.

Resin Tape

The resin tape 15 is provided laterally wound (spirally wound) on the metal resin tape 14, as illustrated in FIG. 1. The resin tape 15 is constituted by at least of a resin base material and an adhesive layer provided an outermost surface of one surface of the resin base material. This resin tape 15 is provided laterally wound with the side of the adhesive layer being on the side of the metal resin tape 14. This way, the resin tape 15 and metal resin tape 14 are adhered and fixed, and thus the metal resin tape 14 does not shift in position even in a case in which stress is applied during wiring. As a result, it is possible to suppress a reduction in the shielding effect affected by the metal resin tape 14 and the lateral winding shield 13. It should be noted that the terms "at least" and "outermost surface" mean that other layers may be provided between the resin base material and the adhesive layer or on the other surface of the resin base material, as desired. Further, the other surface is not provided with an adhesive layer and thus is not adhered to the extruded sheath 16 formed thereon, and the advantage is also that, in a case in which stress is applied during wiring, for example, slippage occurs at an interface between the resin tape 15 and the extruded sheath 16, making bending flexible.

The resin tape 15, similar to the above-described metal resin tape 14, is wound in layers within a range of ¼ wrap to ½ wrap. With the resin tape 15 wrapped within this range, the adhesive layer constituting the resin tape 15 can fix the resin tape 15 itself, and adhere to the metal resin tape 14 and fix the metal resin tape 14. When a wrap is less than ¼, the overlap is small and thus may shift in position during lateral winding, and when the wrap exceeds ½, an overlap thickness of the resin tape 15 is increased, which may be disadvantageous in terms of achieving a smaller diameter. It should be noted that a winding pitch of the resin tape 15 is set as desired by the width and the wrap of the resin tape 15, but in a case in which the width of the resin tape 15 is within a range of about 3 to 6 mm, for example, the winding pitch is preferably within a range of 1.5 to 10 mm, for example. A lateral winding direction of the resin tape 15 may be the same as the lateral winding direction of the metal resin tape 14 described above or may be a winding direction opposite thereto, but the winding direction opposite thereto is preferred.

In the coaxial cable 10 according to the present invention, given T1 as the thickness of the metal resin tape 14 and T2 as the thickness of the resin tape 15, T2/T1 is within a range from 0.180 to 0.800. This way, it is possible to reduce the size of the step (approximately 7 μm or less) compared to a case in which the metal resin tape 14 is used alone. Therefore, appearance irregularities caused by air existing in these steps can be suppressed. This makes it possible to suppress changes in outer diameter in the longitudinal direction and process terminals under the same conditions when connecting the terminals to connectors.

In a case in which T2/T1 is greater than 0.800, a step occurs in the resin tape 15 as well, and thus a sufficient improvement effect may not be obtained. In a case in which T2/T1 is less than 0.180, the resin tape 15 is too thin, and an extent of the step in the metal resin tape 14 may remain as is, thereby obtaining a sufficient improvement effect. A size of the step that affects the appearance differs depending on the overall outer diameter as well, but in a case in which a step of 10 μm or greater occurs, for example, the appearance becomes noticeably uneven, and thus a step of less than 10 μm is preferably the limit. It should be noted that the thickness T2 of the resin tape 15 preferably satisfies the relationship "T2/T1=0.180 to 0.800," and specifically is a thickness from 4 μm to less than 10 μm, more specifically, from 4 μm to 9 μm.

The resin base material constituting the resin tape 15 is not particularly limited, and examples include polyethylene terephthalate (PET), polyethylene naphthalate (PEN), polyamide (PA), polyimide (PI), polyphenylene sulfide (PPS), ethylene-tetrafluoroethylene copolymer (ETFE), tetrafluoroethylene-hexafluoropropylene copolymer (FEP), fluorinated resin copolymer (perfluoroalkoxy fluororesin: PFA), polyether ether ketone (PEEK), and the like. In particular, a polyester film such as polyethylene terephthalate and polyethylene naphthalate can be preferably used. A thickness of the resin base material is selected as desired from those within a range of about 2 to 6 mm, for example.

The adhesive layer constituting the resin tape 15 is provided on one surface of the resin base material, and examples of a material thereof include a urethane adhesive, an epoxy adhesive, an acrylic adhesive, and the like. The thickness of the adhesive layer is also not particularly limited, but may be about 1 to 3 μm.

Extruded Sheath

The extruded sheath 16 is provided by extrusion molding on the resin tape 15. As the constituent resin of the extruded sheath 16, various resins applied to resin extrusion for outer coated bodies can be used. For example, the resin may be a fluorine-based resin such as PFA, ETFE, or FEP, may be a vinyl chloride resin, may be a polyolefin resin such as polyethylene, or may be a polyester resin such as polyethylene terephthalate. In the coaxial cable 10 according to the present invention, a fluororesin is preferred.

In a case in which the extruded sheath 16 is provided, preferably extrusion molding is performed while suctioning with a vacuum pump so that as little air as possible remains between the extruded sheath 16 and the resin tape 15. A total thickness of the outer coated body constituted by this extruded sheath 16 and the above-described resin tape 15 may be within a range of about 0.1 to 1.0 mm, for example.

A final outer diameter of the coaxial cable 10 obtained is preferably within a range of about 0.6 to 3.5 mm. In such a coaxial cable 10, appearance irregularities are suppressed, making it possible to suppress changes in outer diameter in the longitudinal direction and process the terminals under the same conditions when connecting the terminals to the connectors. Further, it is possible to realize a smaller diameter compared to a braided shield and, even in a case in which gaps temporarily occur in the lateral winding shield, suppress a reduction in the shielding effect. As a result, it is possible to realize a smaller diameter that enables in-device wiring in a narrow space, and is particularly preferred for use in in-device antenna wiring and semiconductor devices that support the fifth generation communication standard (5G).

EXAMPLES

In the following, the present invention will be more specifically described through examples. It should be noted that the present invention is not limited to the examples below.

Example 1

First, the coaxial cable 10 having a form illustrated in FIG. 1 was fabricated. A silver-plated soft copper wire having an outer diameter of 0.203 mm was used as the center conductor 11. Next, PFA resin (manufactured by DuPont, dielectric constant 2.1) having a thickness of 0.21 mm was extruded to form the solid structure illustrated in FIG. 2A on the outer periphery of the center conductor 11, and the outer diameter was 0.623 mm. Next, the lateral winding shield 13 and the metal resin tape 14 were provided as the external conductor. The lateral winding shield 13 was formed as a single layer on the insulator 12. Specifically, the lateral winding shield 13 was formed by using and counterclockwisely winding 38 silver-plated soft copper wires having an outer diameter of 0.05 mm at a 6.5-mm pitch. The outer diameter after formation was 0.723 mm. Next, the metal resin tape 14 was wound on the lateral winding shield 13. The metal resin tape 14 used was a metal resin tape having a total thickness of 12 μm and a width of 3 mm and provided with a copper foil having a thickness of 4 μm on one surface of a PET base material having a thickness of 8 μm. This metal resin tape 14 was wound in the direction opposite to that of the lateral winding shield 13, with the copper foil side being on the inside (side of the lateral winding shield 13) by ⅓ wrap (overlapping by a width of 1 mm only).

Next, the resin tape 15 having a total thickness of 4 μm and a width of 3 mm and provided with an adhesive layer having a thickness of 1 μm on one surface thereof, was wound on the metal resin tape 14, with the adhesive layer side being on the inside (side of the metal resin tape 14). The winding form was ⅓ wrap (overlapping by a width of 1 mm only), and the resin tape 15 was wound in the direction opposite to that of the metal resin tape 14. Heating was performed during the winding process, and the adhesive layer and the metal resin tape 14 were adhered. Subsequently, as the extruded sheath 16, a PFA resin (manufactured by DuPont) layer was extruded and formed to a thickness of 50 μm while suctioning with a vacuum pump, and the coaxial cable 10 having an outer diameter of 0.871 mm was fabricated. In this coaxial cable 10, the thickness T1 of the metal resin tape 14 and the thickness T2 of the resin tape 15 had a relationship such that T2/T1 was $4/12=0.333$.

Example 2

In Example 1, as the resin tape 15, a resin tape having a total thickness of 6 μm and a width of 3 mm and provided with an adhesive layer having a thickness of 1 μm on one surface thereof, was used. With all other conditions being the same as in Example 1, the coaxial cable of Example 2 having an outer diameter of 0.877 mm was fabricated. In this coaxial cable 10, the thickness T1 of the metal resin tape 14 and the thickness T2 of the resin tape 15 had a relationship such that T2/T1 was $6/12=0.500$.

Example 3

In Example 1, as the resin tape 15, a resin tape having a total thickness of 3 μm and a width of 3 mm and provided with an adhesive layer having a thickness of 1 μm on one surface thereof, was used. With all other conditions being the same as in Example 1, the coaxial cable of Example 3 having an outer diameter of 0.868 mm was fabricated. In this coaxial cable 10, the thickness T1 of the metal resin tape 14 and the thickness T2 of the resin tape 15 had a relationship such that T2/T1 was $3/12=0.250$.

Example 4

In Example 1, as the resin tape 15, a resin tape having a total thickness of 8 μm and a width of 3 mm and provided with an adhesive layer having a thickness of 1 μm on one surface thereof, was used. With all other conditions being the same as in Example 1, the coaxial cable 10 of Example 4 having an outer diameter of 0.883 mm was fabricated. In this coaxial cable, the thickness T1 of the metal resin tape 14 and the thickness T2 of the resin tape 15 had a relationship such that T2/T1 was $8/12=0.667$.

Example 5

In Example 1, as the metal resin tape 14, a metal resin tape having a total thickness of 16 μm and a width of 3 mm and provided with a copper foil having a thickness of 4 μm on one surface of a PET base material having a thickness of 12 μm, was used. With all other conditions being the same as in Example 1, the coaxial cable of Example 5 having an outer diameter of 0.883 mm was fabricated. In this coaxial cable 10, the thickness T1 of the metal resin tape 14 and the thickness T2 of the resin tape 15 had a relationship such that T2/T1 was 4/16=0.250.

Example 6

In Example 1, as the metal resin tape 14, a metal resin tape having a total thickness of 10 μm and a width of 3 mm and provided with a copper foil having a thickness of 4 μm on one surface of a PET base material having a thickness of 6 μm, was used. With all other conditions being the same as in Example 1, the coaxial cable of Example 6 having an outer diameter of 0.865 mm was fabricated. In this coaxial cable 10, the thickness T1 of the metal resin tape 14 and the thickness T2 of the resin tape 15 had a relationship such that T2/T1 was 4/10=0.400.

Example 7

In Example 1, the insulator 12 had a hollow structure. The hollow structure was obtained by extruding PFA resin (manufactured by DuPont) at 350° C. in a die and a nipple for hollow structure formation, and forming a hollow structure having a cross-sectional form in which the void part is surrounded by the inner annular part **12*a* having a thickness of 0.05 mm, the outer annular part 12*b* having a thickness of 0.05 mm, and the coupling part 12*c* having a thickness of 0.05 mm, and the porosity was 54%. With all other conditions being the same as in Example 1, the coaxial cable 10** of Example 7 was fabricated.

Example 8

In Example 1, as the metal resin tape 14, the two pieces of metal resin tape **14*a*, 14*b* were used. The first metal resin tape 14*a* used was a metal resin tape having a total thickness of 10 μm and a width of 3 mm and provided with a copper foil having a thickness of 4 μm on one surface of a PET base material having a thickness of 6 μm. Furthermore, as the second metal resin tape 14*b* thereon, a metal resin tape having a total thickness of 12 μm and a width of 3 mm and provided with a copper foil having a thickness of 6 μm on one surface of a PET base material having a thickness of 6 μm, was used and wound in layers in the opposite direction. With all other conditions being the same as in Example 1, the coaxial cable of Example 8 having an outer diameter of 0.901 mm was fabricated. In this coaxial cable 10, the thickness T1 (total 22 μm) of the metal resin tape 14 (two pieces of metal resin tape 14*a*, 14*b*) and the thickness T2 (4 μm) of the resin tape 15** had a relationship such that T2/T1 was 4/22=0.182.

Example 9

In Example 8, as the first metal resin tape **14*a* and the second metal resin tape 14*b*, the same tape having a total thickness of 10 μm and a width of 3 mm and provided with a copper foil having a thickness of 4 μm on one surface of a PET base material having a thickness of 6 μm, was used. The two pieces of metal resin tape were wound in opposite directions. With all other conditions being the same as in Example 1, the coaxial cable of Example 9 having an outer diameter of 0.895 mm was fabricated. In this coaxial cable 10, the thickness T1 (total 20 μm) of the metal resin tape 14 (two pieces of metal resin tape 14*a*, 14*b*) and the thickness T2 (4 μm) of the resin tape 15** had a relationship such that T2/T1 was 4/20=0.200.

Comparative Example 1

In Example 1, the resin tape 15 was not provided. With all other conditions being the same as in Example 1, the coaxial cable of Comparative Example 1 was fabricated.

Comparative Example 2

In Example 1, as the resin tape 15, a resin tape having a total thickness of 10 μm and a width of 3 mm and provided with an adhesive layer having a thickness of 1 μm on one surface thereof, was used. With all other conditions being the same as in Example 1, the coaxial cable of Comparative Example 2 having an outer diameter of 0.889 mm was fabricated. In this coaxial cable, the thickness T1 of the metal resin tape 14 and the thickness T2 of the resin tape 15 had a relationship such that T2/T1 was 10/12=0.833.

Comparative Example 3

In Example 1, as the resin tape 15, a resin tape having a total thickness of 2 μm and a width of 3 mm and provided with an adhesive layer having a thickness of 1 μm on one surface thereof, was used. With all other conditions being the same as in Example 1, the coaxial cable of Comparative Example 3 having an outer diameter of 0.856 mm was fabricated. In this coaxial cable, the thickness T1 of the metal resin tape 14 and the thickness T2 of the resin tape 15 had a relationship such that T2/T1 was 2/12=0.166.

Evaluation

The steps and the appearances were visually evaluated. Steps were formed mainly in the tape of the uppermost layer, and were 4 μm for Examples 1, 5, 6, 7, 8, and 9, 6 μm for Example 2, 3 μm for Example 3, 8 μm for Example 4, 12 μm for Comparative Example 1, and 10 μm for Comparative Example 2. It should be noted that, in Comparative Example 3, the resin tape 15 of the uppermost layer had a thickness of only 2 μm, and the metal resin tape 14 therebelow having a thickness of 12 μm had a significant influence, resulting in a size of an overall step of approximately 8 to 7 μm. Further, as the results of Examples 1 to 9, T2/T1 was within a range from 0.182 to 0.667.

The final appearance of the coaxial cable after being provided with the extruded sheath 16 fluctuated slightly in Examples 1 to 9, but the fluctuations were small compared to those in Comparative Examples 1 to 3, and the terminals could also be processed under the same conditions. In this way, it was visually confirmed that an air layer was reduced by making the size of the step smaller, the appearance was improved, and a waviness (outer diameter fluctuation) in the longitudinal direction was reduced.

Figure 4:
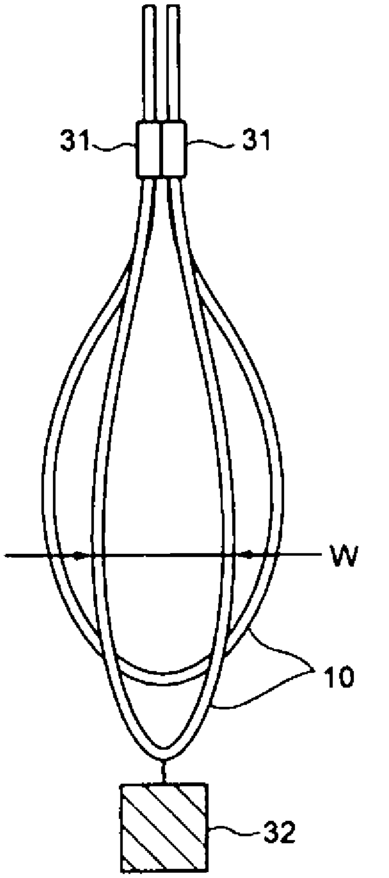
FIG. 4 is a schematic view illustrating a test method of flexibility of the coaxial cable.

The flexibility of the coaxial cable was evaluated using the method illustrated in FIG. 4. For the flexibility test, both ends of the coaxial cable 10 having a length of 700 mm were fixed by a fixture 31, and a maximum width W in the case of no weight 32 being attached and the maximum width W in a case of the weight 32 of 2 g being attached to the lowermost point of the coaxial cable 10, were measured. It can be said that a smaller maximum width W results in higher flexibility. As a result of the evaluation, it could be determined that both Examples 8 and 9 had favorable flexibility.

DESCRIPTIONS OF REFERENCE NUMERALS

10 Coaxial cable
11 Center conductor
12 Insulator
12*a* Inner annular part
12*b* Outer annular part
12*c* Coupling part
12' Void part
13 Lateral winding shield
14 Metal resin tape
14*a* First metal resin tape
14*b* Second metal resin tape
15 Resin tape
16 Extruded sheath
31 Fixture
32 Weight

What is claimed is:

1. A coaxial cable comprising:
a center conductor;
an insulator provided on an outer periphery of the center conductor;
an external conductor provided on an outer periphery of the insulator; and
an outer coated body covering the external conductor,
the external conductor being constituted by a lateral winding shield provided with metal fine wires laterally wound on the outer periphery of the insulator, and a metal resin tape wound in a layer on the lateral winding shield with a metal layer side being on an inside,
the outer coated body being constituted by a resin tape wound on the metal resin tape, and an extruded sheath covering the resin tape, and
given T1 as a thickness of the metal resin tape and T2 as a thickness of the resin tape, T2/T1 being within a range from 0.180 to 0.800,
wherein a thickness of the resin tape is 4 μm to 9 μm.

2. The coaxial cable according to claim 1, wherein
the metal resin tape consists of one piece of tape or two pieces of tape.

3. The coaxial cable according to claim 2, wherein,
in a case in which the metal resin tape is constituted by two pieces of metal resin tape, a thickness of a first metal resin tape is the same as a thickness of a second metal resin tape, or is thinner than the thickness of the second metal resin tape.

4. The coaxial cable according to claim 2, wherein,
in a case in which the metal resin tape is constituted by one piece of metal resin tape, a thickness of the metal resin tape is 8 μm to 18 μm.

5. The coaxial cable according to claim 2, wherein,
in a case in which the metal resin tape is constituted by two pieces of metal resin tape, a total thickness of the two pieces of metal resin tape is 16 μm to 26 μm.

6. The coaxial cable according to claim 1, wherein
the metal resin tape and the resin tape are wound in layers within a range of ¼ wrap to ½ wrap.

7. The coaxial cable according to claim 1, wherein
an adhesive layer is provided on one surface of the resin tape and winding is performed so that the adhesive layer is on an inside.

8. A coaxial cable comprising:
a center conductor;
an insulator provided on an outer periphery of the center conductor;
an external conductor provided on an outer periphery of the insulator; and
an outer coated body covering the external conductor,
the external conductor being constituted by a lateral winding shield provided with metal fine wires laterally wound on the outer periphery of the insulator, and a metal resin tape wound in a layer on the lateral winding shield with a metal layer side being on an inside,
the outer coated body being constituted by a resin tape wound on the metal resin tape, and an extruded sheath covering the resin tape, and
given T1 as a thickness of the metal resin tape and T2 as a thickness of the resin tape, T2/T1 being within a range from 0.180 to 0.800,
wherein an adhesive layer is provided on one surface of the resin tape and winding is performed so that the adhesive layer is on an inside.

* * * * *